United States Patent [19]

De La Fuente

[11] Patent Number: 5,958,123

[45] Date of Patent: Sep. 28, 1999

[54] INK COMPOSITION

[75] Inventor: David I. De La Fuente, Redbridge, United Kingdom

[73] Assignee: Eastman Kodak Company, Rochester, N.Y.

[21] Appl. No.: 09/030,991

[22] Filed: Feb. 26, 1998

[30] Foreign Application Priority Data

Mar. 11, 1997 [GB] United Kingdom .................. 9704992

[51] Int. Cl.$^6$ ..................................... C09D 11/02
[52] U.S. Cl. ..................... 106/31.69; 106/31.9; 106/417; 106/418
[58] Field of Search .............................. 106/31.69, 31.9, 106/417, 418

[56] References Cited

U.S. PATENT DOCUMENTS

| | | | |
|---|---|---|---|
| 4,180,407 | 12/1979 | Gibson et al. | 106/31.69 |
| 4,205,997 | 6/1980 | Hesse et al. | 106/418 |
| 5,779,777 | 7/1998 | Okuda et al. | 106/417 |

FOREIGN PATENT DOCUMENTS

| | | |
|---|---|---|
| 2040465 | 4/1991 | Canada . |
| 53-56268 | 5/1978 | Japan . |
| 54-10724 | 1/1979 | Japan . |
| 55-082170 | 6/1980 | Japan . |
| 56-129269 | 10/1981 | Japan . |
| 1301772 | 12/1989 | Japan . |
| 6145570 | 5/1994 | Japan . |

*Primary Examiner*—Helene Klemanski
*Attorney, Agent, or Firm*—Carl F. Ruoff

[57] ABSTRACT

An ink composition comprises water;

a mica-based pigment;

a hydroxyalkyl cellulose binder; and, a water-soluble or water-dispersible surfactant coating aid.

The composition is suitable for printing paper e.g. photographic paper base.

14 Claims, No Drawings

INK COMPOSITION

FIELD OF THE INVENTION

This invention describes an aqueous based printing ink suitable for printing on paper and adequately dried under relatively mild conditions to help retain moisture in the paper. More particularly, this invention relates to photographic paper supports which are coated or printed on one side of the paper then encapsulated in a polyolefin layer.

BACKGROUND OF THE INVENTION

Many inks used in the printing industry tend to have volatile organic compounds used either as the medium for dissolving dyes or as a coating aid. This requires the use of specialised mixing or handling procedures and usually some degree of flame-proofing during application.

Legislation in many countries now limits the amount of volatile organic compounds emitted to air, requiring expensive treatment to either condense these compounds for recycling/disposal or to incinerate the vapours.

Inks containing volatile organic solvents and aqueous based inks commonly use hot air drying techniques.

JP-A-1301772 describes a water-based gold pigment ink comprising a brass and/or copper powder pigment, a dispersant, water and a particular aromatic amine. The amine is believed to suppress the oxidation of the metal powder pigments thereby preventing colour change of the ink over time.

Use of mica-based gold coloured pigment is featured in the paint industry (e.g. JP-A-56129269, JP-A-87021385 and JP-A-55082170).

PROBLEM TO BE SOLVED BY THE INVENTION

Aqueous based inks are required to avoid the problems associated with inks containing organic solvents.

Inks are required which can be dried more efficiently than by the use of hot air drying e.g. by using infra red drying techniques.

Aqueous based inks are required suitable for rotogravure printing which are not susceptible to foaming during use.

SUMMARY OF THE INVENTION

The invention provides an ink composition comprising water;

a mica-based pigment;

a hydroxyalkyl cellulose binder; and, a water-soluble or water-dispersible surfactant coating aid.

The invention also provides paper printed with an ink composition of the invention.

ADVANTAGEOUS EFFECT OF THE INVENTION

The inks of the invention are free of flammable, volatile organic compounds and do not require the use of specialised mixing or handling procedures. Furthermore, they do not require flame-proofing during application.

DETAILED DESCRIPTION OF THE INVENTION

The ink composition comprises an aqueous phase containing a mica-type pigment, preferably of mica coated with one or more metal oxides. In a preferred embodiment a gold pigment comprising mica coated with titanium dioxide and iron oxide is employed. An advantage of the use of such pigments is that the ink colour does not fade over time.

Preferably, the pigment is present in an amount from 10 to 25, more preferably from 13 to 17 weight % based on the weight of the composition. The amount of pigment used will depend on such factors as coating weight and the method of application.

To achieve good coverage and a realistic hue, the pigment particle mean diameter may be from 5 to 110 $\mu$m, preferably within the range 6 to 50 $\mu$m and more preferably within the range 10 to 30 $\mu$m.

The binder is a hydroxyalkyl cellulose with an appropriate viscosity to sustain the pigment in suspension. The preferred viscosity range for the binder is from 90–160 cps at 25° C. for a 5% aqueous solution as measured using a Brookfield LVF spindle at 30 rpm. The selection of the hydroxyalkyl cellulose is important to give the ink composition the correct coating and drying characteristics. The preferred hydroxyalkyl cellulose is hydroxyethyl cellulose.

An advantage of the hydroxyalkyl cellulose binder is that it can be dispersed in water at room temperature i.e. the ink can be prepared without heating to dissolve the binder.

The hydroxyalkyl cellulose is preferably used in an amount from 2.0 to 6.0, more preferably from 3.0 to 4.0 weight % by weight of the composition.

The ratio by weight of gold pigment to hydroxyethyl cellulose is preferably between 4 to 1 and 6 to I but this may vary depending on application and drying conditions.

The viscosity of the binder also influences the speed of settlement without stirring or agitation. For a preferred ink composition of this invention, separation does not occur for at least 15 minutes and can be greater than 30 minutes depending on pigment concentration.

The dispersant for the pigment and binder is water which may be present in an amount from 73 to 87, preferably from 79 to 81 weight % of the composition.

For various coating and printing processes, the surface tension of water-based formulations is too high leading to coating defects. For this reason, a surfactant or wetting agent is used as a coating aid.

A water-soluble or water-dispersible surfactant coating aid is used to act as a coating aid. Preferably, a non-ionic surfactant is used. Examples of suitable surfactants include the naturally occurring glycosides e.g. saponin.

The coating aid may be used in an amount from 0.027 to 0.080, preferably from 0.05 to 0.07 weight % of the composition.

The use of a coating aid can lead to foam formation which in turn gives other types of coating problems. For example, foam can be generated during the ink manufacturing stage and/or the application process, which can affect the coating uniformity of the ink. For this reason, the ink composition preferably comprises a water-soluble or water-dispersible defoaming agent to remove any tendency to sustain foam in the ink formulation.

Suitable defoaming agents include various polyglycol diesters and tributyl phosphate. A preferred defoaming agent is a non-volatile polyglycol diester e.g. a polyalkyleneglycol diester such as polyethyleneglycol dioleate.

The defoaming agent may be added at low concentration e.g. from 0.05 and 1.0 weight % based on the composition to quench the foam.

Pigments in suspension tend to settle with time and it is a common approach to stir these solutions prior to use, or rely on recirculation during application or both, to maintain uniformity of the mixture.

Other known ink additives may be included in the composition of the invention such as slip agents and gloss enhancers.

The ink composition of the invention may be prepared by mixing the water and binder to form a homogeneous composition of desired viscosity. The remaining components of the ink can then be added and mixed in.

The ink composition preferably has a viscosity from 60 to 200 cps at 20° C. for a 19% aqueous solution as measured using a Brookfield ELV-8, with spindle L1 at 30 rpm.

A preferred method of applying the ink to a support is by rotogravure printing. Other forms of printing include lithography and flexography.

In a preferred application, the ink composition is used for printing a sheet of paper used as a support in a photographic element. The support may be coated on one or both sides with a layer of resin e.g. polyolefin. An advantage of the ink composition of the invention is that it provides thermal stability, especially when the paper is being coated with a layer of polyolefin at a temperature greater than 300° C.

The support may be coated with one or more photosensitive silver halide emulsion layers. For use on a photographic support, the ink composition must be free of any compounds or their precursors which are capable of migrating to and fogging a silver halide emulsion. For example, for a support encapsulated in polyolefin, the ink should not contain such compounds capable of migrating through the polyolefin layer.

The ink does not inhibit adhesion of resin e.g. polyolefin layers to paper after corona discharge treatment, and is suitable for production of photographic supports or similar laminated papers.

The invention is further illustrated by way of example as follows.

EXAMPLE

An ink composition in accordance with the invention was prepared as follows.

The binder was slowly added to the required quantity of water with stirring. Time was allowed for the binder to dissolve before slowly adding the pigment. The coating aid is then added, followed by the defoamer.

The support materials were a highly sized paper base ranging between 165 and 190 g/m$^2$. Coating trials were carried out on paper both with and without a corona pretreatment, and with the ink applied to the back of the product.

The following typical formulation was applied through a short dwell time applicator, as well as by direct gravure onto a paper support. Paper was coated with a solution containing 18% to 19% by weight solids at wet coverages between 2.6 g/m$^2$ and 13 g/m$^2$ and drying conditions including both hot air impingement and infra-red emitters (wavelength 1.2 μm), were adjusted to suit. Drying was confirmed by touch and trying to smear the coating immediately after exiting the dryer.

| Material | Weight % |
| --- | --- |
| Gold pigment | 15.34% |
| Cellosize ™ | 3.55% |

-continued

| Material | Weight % |
| --- | --- |
| Glycoside | 0.06% |
| Polyglycol Diester | 0.06% |
| Water | 80.99% |

The composition had a pH of 7.8 and a viscosity of 151 cps.

The gold pigment was a pearlescent pigment consisting of mica platelets coated with titanium dioxide and iron oxide available from The Mearle Corporation.

Cellosize™ is a low molecular weight hydroxyethyl cellulose available from Union Carbide UK Limited.

Glycoside is Saponin QA available from Ubichem Limited.

Polyglycol Diester represents Emerest 2648 PEG(400) dioleate available from Henkel Corporation.

In order to simulate foam generation such as that found with aggressive recirculation, air was passed through a gauze at constant air pressure through the ink formulation at 20° C. The height of froth in millimeters was then measured with various concentrations of defoaming agent.

| Concentration of Defoamer(*) | Height of Foam (mm) |
| --- | --- |
| 0 | >50 |
| 0.003 | >50 |
| 0.02 | 28 |
| 0.08 | 15 |
| 0.16 | 2 |
| 0.32 | 2 |
| 0.63 | 2 |

(*)% of made-up batch

To assess the impact of coatability some static surface tension measurements were taken at 20° C., on a 5% by weight concentration of the ink.

| Concentration of Defoamer (*) | Surface Tension (mN/m) |
| --- | --- |
| 0 | 50 |
| 0.003 | 48 |
| 0.02 | 48 |
| 0.08 | 48 |
| 0.16 | 47 |
| 0.32 | 46 |
| 0.63 | 32 |

(*)% of made-up batch

Inks of this type separate with time, and this was assessed by pouring two liters of ink into a clear Pyrex beaker and visually determining when striation occurs. This was a minimum of 15 minutes but was usually.30 minutes.

The ink was subjected to a rheology check using a Carri-Med CS Rheometer, which confirmed the ink behaviour to be Newtonian.

| Shear Rate (l/s) | Shear Stress (Pa) |
| --- | --- |
| 0 | 0 |
| 123.5 | 12 |
| 212 | 17.6 |
| 359 | 32.8 |

-continued

| Shear Rate (l/s) | Shear Stress (Pa) |
|---|---|
| 447 | 41.6 |
| 600 | 52 |
| 706 | 61.6 |
| 841 | 72 |
| 959 | 81.6 |
| 1094 | 92 |

What is claimed is:

1. An ink composition comprising
   water;
   a mica-based pigment;
   a hydroxyalkyl cellulose binder; and,
   a water-soluble or water-dispersible surfactant coating aid.

2. An ink composition according to claim 1 wherein the pigment comprises mica coated with titanium dioxide and iron oxide.

3. An ink composition according to claim 1 or claim 2 wherein the pigment is present in an amount from 10 to 25 weight % based on the weight of the composition.

4. An ink composition according to claim 1 wherein the binder is hydroxyethyl cellulose.

5. An ink composition according to claim 1 wherein the binder is present in an amount from 2 to 6 weight % based on the weight of the composition.

6. An ink composition according to claim 1 wherein the coating aid is a naturally occurring glycoside.

7. An ink composition according to claim 1 further comprising a water-soluble or water-dispersible defoaming agent.

8. An ink composition according claim 7 wherein the defoaming agent is a non-volatile polyglycol diester.

9. An ink composition according to claim 1 wherein the ratio by weight of pigment to hydroxyalkyl cellulose is between 4 to 1 and 6 to 1.

10. An ink composition according to claim 1 wherein the viscosity range of the binder is from 90 to 160 cps at 25° C. for a 5% aqueous solution.

11. A paper coated or printed with an ink composition according to claim 1.

12. A paper according to claim 11 in the form of a sheet coated with a resin layer.

13. A photographic element comprising a paper support according to claim 11 including one or more light sensitive silver halide emulsion layers coated thereon.

14. A photographic element comprising a paper support according to claim 12 including one or more light sensitive silver halide emulsion layers coated thereon.

* * * * *